United States Patent
Kulkarni et al.

(10) Patent No.: US 8,284,658 B2
(45) Date of Patent: Oct. 9, 2012

(54) METHOD FOR RECONFIGURING A COMMUNICATIONS NETWORK

(75) Inventors: Vivek Kulkarni, Unterhaching (DE); Martin Nathansen, München (DE); Elie Sfeir, München (DE)

(73) Assignee: Siemens Aktiengesellschaft, München (DE)

( * ) Notice: Subject to any disclaimer, the term of this patent is extended or adjusted under 35 U.S.C. 154(b) by 379 days.

(21) Appl. No.: 12/593,972

(22) PCT Filed: Mar. 14, 2008

(86) PCT No.: PCT/EP2008/053108
§ 371 (c)(1),
(2), (4) Date: Sep. 30, 2009

(87) PCT Pub. No.: WO2008/119649
PCT Pub. Date: Oct. 9, 2008

(65) Prior Publication Data
US 2010/0110884 A1    May 6, 2010

(30) Foreign Application Priority Data
Mar. 30, 2007    (DE) .......................... 10 2007 015 539

(51) Int. Cl.
*G01R 31/08*    (2006.01)
(52) U.S. Cl. ........................ 370/228; 370/242
(58) Field of Classification Search .................. 370/228, 370/242
See application file for complete search history.

(56) References Cited

U.S. PATENT DOCUMENTS

| | | | |
|---|---|---|---|
| 6,222,855 B1 | 4/2001 | Kimber et al. | |
| 6,262,977 B1 | 7/2001 | Seaman et al. | |
| 2005/0138008 A1 | 6/2005 | Tsillas | |
| 2005/0207348 A1* | 9/2005 | Tsurumi et al. | 370/241 |
| 2005/0249123 A1* | 11/2005 | Finn | 370/242 |
| 2006/0047851 A1 | 3/2006 | Voit et al. | |
| 2006/0271709 A1* | 11/2006 | Vasko et al. | 709/249 |
| 2007/0047556 A1 | 3/2007 | Raahemi et al. | |
| 2009/0067321 A1 | 3/2009 | Veits | |

FOREIGN PATENT DOCUMENTS

| | | |
|---|---|---|
| DE | 102005017021 A1 | 10/2006 |
| EP | 1768319 A1 | 3/2007 |
| WO | WO 03024029 A2 | 3/2003 |

OTHER PUBLICATIONS

Standard IEEE 802.1w, "Media Access Control (MAC) Bridges—Amendment 2: Rapid Reconfiguration", 2001, pp. i-viii, 1-108, ISBN 0-7381-2924-9, Institute of Electrical and Electronics Engineers, Inc.

* cited by examiner

*Primary Examiner* — David Oveissi

(57) ABSTRACT

A method of reconfiguring a communications network is provided. A first network using a first network protocol and a second network using a second network protocol are connected by a master data link initialized as activated and two slave data links initialized as inactivated. A failure of the master data link or a slave data link is detected by a master bridge of the second network, the master bridge being connected to the master data link. A first data packet is generated by the master bridge and is transmitted to a slave bridge of the second network, the slave bridge being connected to a slave data link. The slave bridge is selected by the master bridge according to a selection rule. The first data packet contains information which initiates a partial execution of the first network protocol on a port of the slave bridge and an activation of the slave data link by the first network protocol.

20 Claims, 2 Drawing Sheets

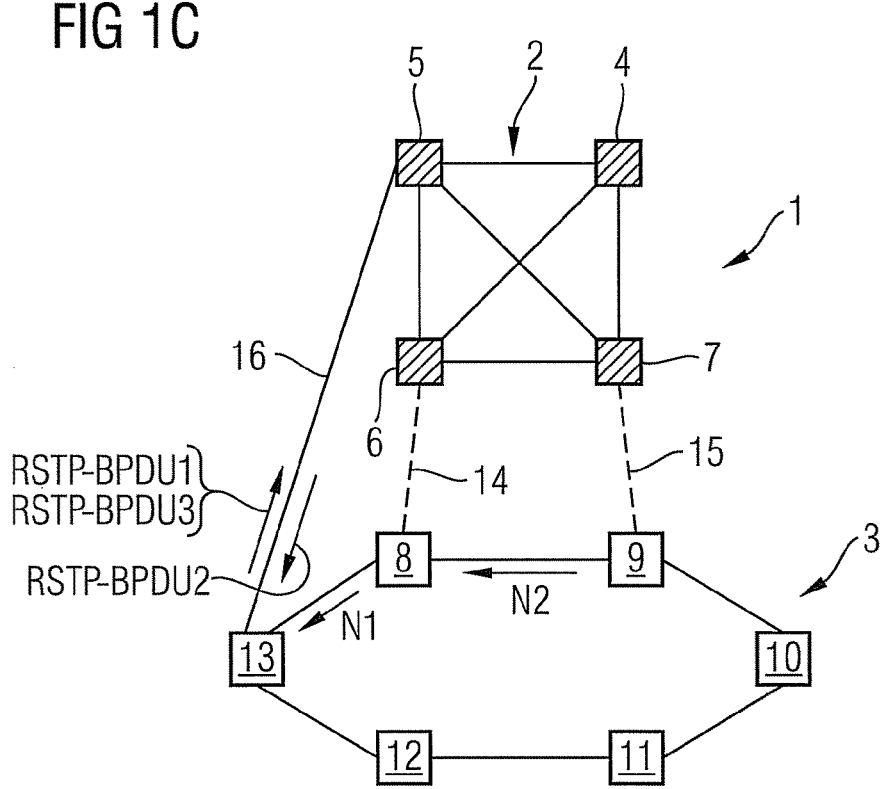
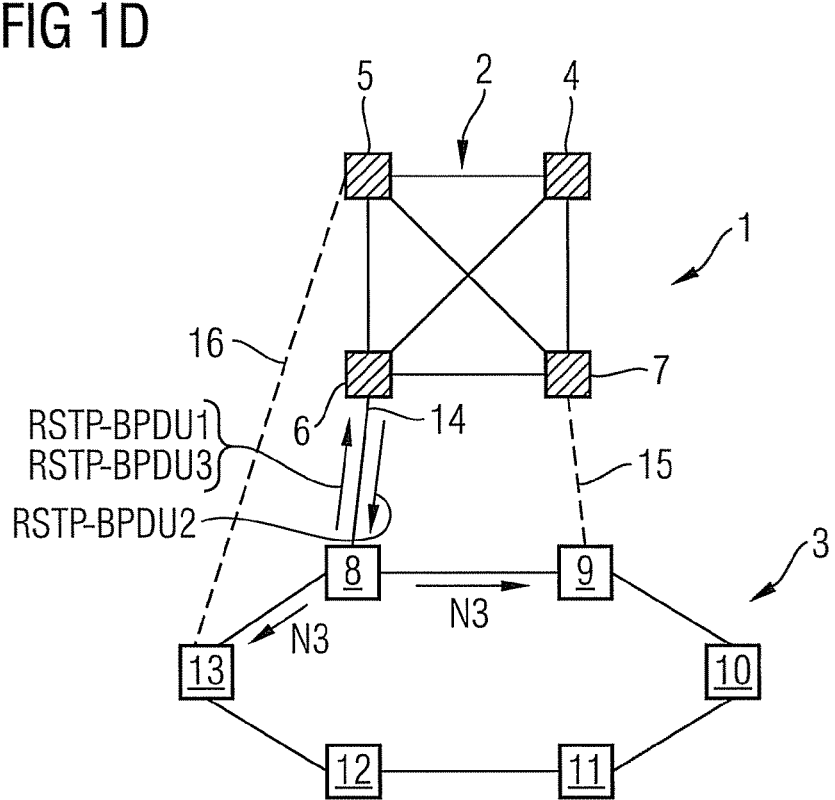

METHOD FOR RECONFIGURING A COMMUNICATIONS NETWORK

CROSS REFERENCE TO RELATED APPLICATIONS

This application is the US National Stage of International Application No. PCT/EP2008/053108 filed Mar. 14, 2008, and claims the benefit thereof. The International Application claims the benefits of German Patent Application No. 10 2007 015 539.7 DE filed Mar. 30, 2007; both of the applications are incorporated by reference herein in their entirety.

FIELD OF INVENTION

The invention is in the technical area of packet-switched communications networks and relates to a method for reconfiguring a communications network, in which LANs which employ different network protocols are connected to each other.

BACKGROUND OF INVENTION

Packet-switched Ethernet networks (LAN=Local Area Network) are employed both in the industrial and the office environment, where the demands placed on networks are very different. In contrast to the office environment, LANs in day-to-day industrial applications must operate reliably under extreme conditions, such as electromagnetic noise fields, high operating temperatures and mechanical stresses. As the failure of a production plant and the downtimes associated therewith are as a rule bound up with high costs, it is also the case that in industrial applications, failsafe requirements are more exacting than in the office environment.

For this reason, industrial LANs generally employ robust components that enable high-speed redundancy mechanisms, thereby minimizing costs in the event of a fault. In addition a ring topology is usually selected for the network, as this enables a rapid reconfiguration time of less than 500 ms in the case of the failure of a data link or a bridge. Ethernet standard-based standard or proprietary network protocols are generally employed as network protocols for industrial LANs.

By contrast, LANs in office environments are mostly of star-shaped or mesh-type topology and nowadays as a rule employ RSTP (RSTP=Rapid Spanning Tree Protocol) according to IEEE Standard 802.1w as their protocol.

SUMMARY OF INVENTION

In practical applications, ring-shaped industrial LANs are connected together with mesh-type office LANs via data links. In order to enhance the failsafe characteristics of networks connected in this way, it is known that two redundant data links are set up between the two networks, of which only a first redundant data link is activated for data exchange between the two networks, while the second redundant data link is blocked and activated as a backup data link instead of the activated first data link only in the event of a malfunction. It is a disadvantage here that the switchover procedure for activation of the blocked second data link takes a comparatively long time, lasting approximately 30 seconds when RSTP standardized routines are used in the office LAN.

For this reason it would be desirable to have available a method for reconfiguring a communications network connecting two LANs, which enables faster reconfiguration upon failure of one of the two data links connecting the LAN compared with the traditional method.

This object is achieved by a method for reconfiguring a packet-switched communications network as claimed in the claims. Advantageous embodiments of the invention are specified in the dependent claims.

A method for reconfiguring a packet-switched communications network is shown which comprises a (bridge-switched) first network and a (bridge-switched) second network, which are connected to one another by means of at least three redundant data links, of which in each case only one is activated for the exchange of useful data. Here and hereinafter, only the data links connecting the two networks of the communication network are designated "redundant data links". The network nodes of the communications network are here designated "bridges". Within the meaning of the invention switches (switches=multiport bridges) or other network nodes suitable for switching purposes can nevertheless be involved.

The at least three redundant data links comprise one pre-settable activatable or activated master data link employed for the exchange of useful data and at least two presettable inactivatable or inactivated slave data links, which can also be employed upon failure of the master data link for the exchange of useful data.

The two redundant data links in each case connect a bridge of the first network and a bridge of the second network together by data technology means. Each bridge of the second network can hereby be connected in each case with a separate bridge of the first network. It is equally well possible for a number of bridges of the second network to be connected to different ports of the same bridge of the first network.

The bridge of the second network is here connected to the master data link and designated hereinafter as the master bridge. The bridge of the second network connected in each case with a slave data link are here and hereinafter designated as slave bridges. Individual path costs can in each case be assigned to the master and slave bridges of the second network, where the lowest path costs of all bridges connected to a redundant data link of the second network are assigned to the master bridge. The path costs assigned to the master and slave bridges of the second network can be stored in an appropriate data storage device in the master bridge. The path costs assigned to the master and slave bridges of the second network can in particular be transmitted by means of signals from the slave bridges to the master bridge in particular on the basis of the second network protocol.

The first network of the communications network can in particular be installed as an office LAN in an office environment. A first network protocol for data exchange is set up for the first network. RSTP according to IEEE Standard 802.1w is preferably employed as the first network protocol in the first network, which embodies a logical topology in the form of a spanning tree on the physical topology of the first network. The first network preferably has a mesh-type or star-shaped physical topology.

The second network of the communications network can in particular be installed as an industrial LAN in an industrial environment, and employs a second network protocol in particular based on the Ethernet standard for data exchange, which can be a standard or proprietary network protocol. The network protocol of the second network is different from the first network protocol, in particular RSTP. The second network preferably has a ring-shaped topology.

The inventive method for reconfiguration of the communications network comprises the following steps:

Detection of a failure of the (initialized) activated master data link by the master bridge of the second network connected to the master data link. The failure of the master data link can for example be detected by the master bridge ("loss-of-signal") as a result of the non-receipt of a signal transmitted from the bridge of the first network connected to the master data link. For this purpose the master bridge is provided with a device for detection of a signal failure (hardware-detector) of the data link. A so-called hardware-alarm of the master bridge can be initiated hereby.

After detection of the failure of the master data link by the master bridge: generation of a first data packet (N1) by the master bridge and transmission of the first data packet (N1) to a slave bridge of the second network connected to a slave data link. The master bridge selects the slave bridge of the second network for transmission of the first data packet according to a specifiable selection rule. Advantageously, the first data packet (N1) is transmitted by means of the second network protocol from the master bridge of the second network to the slave bridge of the second network.

After transmission of the first data packet by the master bridge: reception and processing of the first data packet by the slave bridge, where the first data packet contains logical information, by means of which the at least partial execution of the first network protocol, in particular RSTP, can be initiated on a port of the slave bridge connected to the slave data link.

After activation of the first network protocol for the port of the slave bridge connected to the slave data link: activation of the slave data link by means of the first network protocol executed on the port of the slave bridge. An activation of the slave data link preferably takes place by means of execution of a handshake mechanism defined in RSTP between the RSTP port of the slave bridge of the second network connected to the inactivated slave data link and a bridge of the first network connected to the inactivated slave data link. An activation of the inactivated slave data link here takes place in RSTP standardized routines.

By means of the inventive method a rapid reconfiguration of the logical topology can be achieved in an advantageous manner upon failure of a data link connecting the two LANs (master data link).

Upon failure of a slave data link activated after failure of the master data link, the inventive method advantageously comprises the further steps:

Detection of the failure of the activated slave data link by a slave bridge of the second network connected to the slave data link. The failure of the activated slave data link can for example be detected by the slave bridge of the second network on the basis of the non-receipt of a signal transmitted from the bridge of the first network connected to the slave data link. To this end the slave bridge is equipped with a device for detection of non-receipt of a signal (hardware detector). A hardware-alarm of the slave bridge can in particular be initiated hereby.

After detection of the failure of the slave data link by the slave bridge: generation of a second data packet (N2) by the slave bridge and transmission of the second data packet (N2) to the master bridge. Advantageously a transmission of the second data packet from the slave bridge of the second network to the master bridge of the second network takes place by means of the second network protocol.

After transmission of the second data packet by the slave bridge: reception and processing of the second data packet (N2) by the master bridge, where the second data packet contains logical information, by means of which the master bridge is informed of the failure of the slave data link.

After detection of the failure of the slave data link by the master bridge the following steps are preferably performed:

Renewed generation of a first data packet (N1) by the master bridge and transmission of the first data packet (N1) to a slave bridge of the second network connected to a (non-failed) slave data link. The master bridge here selects the slave bridge of the second network for transmission of the first data packet according to the prescribed selection rule. Advantageously, the first data packet (N1) is transmitted from the master bridge of the second network to the slave bridge of the second network by means of the second network protocol.

Reception and processing of the first data packet by the selected slave bridge, where the first data packet contains logical information, by means of which the at least partial execution of the first network protocol, in particular RSTP, is initiated on a port of the slave bridge connected to the slave data link.

After activation of the first network protocol on the port of the slave bridge connected to the slave data link: activation of the slave data link via the first network protocol executed on the port of the slave bridge. Activation of the slave data link preferably takes place by means of the execution of a handshake mechanism defined in RSTP between the RSTP port of the slave bridge of the second network connected to the inactivated slave data link and a bridge of the first network connected to the inactivated slave data link. Activation of the inactivated slave data link here takes place by means of routines standardized in RSTP.

The method for activation of a further inactivated slave data link upon the failure of a slave data link activated after failure of the master data link can be repeated for all slave data links of the communications network.

By means of the above method a rapid reconfiguration of the logical topology can be achieved in an advantageous manner upon failure of one of the data links (slave data link) connecting the two LANs.

In a particularly advantageous manner, a selection of the slave bridges for activation of the slave data links connected to the slave bridges takes place in each case according to the path costs assigned to the slave bridges. To this end the master bridge and the slave bridges of the second network are in each case assigned path costs, in particular RSTP path costs, for example via the network protocol. Particularly advantageously, the lowest path costs are here assigned to the master bridge.

After failure of the master data link the master bridge advantageously selects, for activation of a slave data link, that slave bridge to which are assigned the next lower path costs relative to the master bridge. In the case of the failure of an activated slave data link, the master bridge advantageously selects that slave bridge to which are assigned the next lower path costs relative to the slave bridge of the failed slave data link. In this way it can be ensured that the data link between the two networks always has the lowest possible path costs.

In a further advantageous embodiment of the inventive method, this comprises the following further steps:

Detection of the restoration of the failed master data link by the master bridge of the second network. The detection takes place for example by means of a reinstating reception of signals, like an RSTP configuration framework, by the master bridge of the second network.

After detection of the restoration of the master data link by the master bridge: generation of a third data packet (N3) by the master bridge and transmission of the third data packet to the slave bridge of the activated slave data link. The third data packet is advantageously transmitted to all slave bridges. The slave bridges of the activated and inactivated slave data links are hereby informed of the restoration of the master data link.

After transmission of the third data packet: reception and processing of the third data packet by the slave bridge(s), where the third data packet contains logical information, by means of which a termination of the execution of the first network protocol, in particular RSTP, on the slave bridge or a termination of the transmission of the RSTP configuration framework by the slave bridge is brought about.

Subsequently: activation of the master data link and inactivation of the activated slave data links.

A rapid reconfiguration of the logical topology can hereby be achieved in an advantageous manner upon restoration of the master data link.

In an advantageous embodiment of the inventive method the following steps are performed for activation of the restored master data link and for inactivation of the second slave data links after detection of the restoration of the master data links by the master bridge:

At least partial execution of the first network protocol, in particular RSTP, on a port of the master bridge connected to the master data link.

The activation of the master data link preferably takes place by means of the execution of a handshake mechanism implemented in RSTP between the bridges of the first and second network directly connected to the master data link. Forwarding of an RSTP configuration framework generated during the handshake mechanism for activation of the master data link by the master bridge to the bridge of the first network connected to the activated slave data link also takes place, whereby the activated slave data link is inactivated.

Termination of the execution of the first network protocol, in particular RSTP, on the port of the master bridge connected to the master data link.

A particularly rapid reconfiguration of the logical topology can hereby be achieved in an advantageous manner upon restoration of the master data link in particular when using routines implemented in RSTP.

The invention further extends to a packet-switched communications network as described above with a first network employing a first network protocol and a second network employing a second network protocol different from the first network protocol, in which the two networks are connected together by means of at least three redundant data links, of which in each case only one is activated for exchange of useful data, where a master data link is initialized as activated and at least two slave data links are initialized as inactivated. In the communications network the bridges, in particular the bridges connected to a slave data link, are in each case set up in such a way that a method such as that described above can be executed.

The invention further extends to a master bridge of a packet-switched communications network such as that described above. The invention additionally extends to a slave bridge of a packet-switched communications network as described above.

BRIEF DESCRIPTION OF THE DRAWINGS

The invention is now explained in greater detail on the basis of an exemplary embodiment, where reference is made to the attached drawing. Wherein:

FIG. 1A-1D shows a diagrammatic representation to illustrate an exemplary embodiment of the inventive method for reconfiguring a communications network.

DETAILED DESCRIPTION OF INVENTION

Figure 1A:
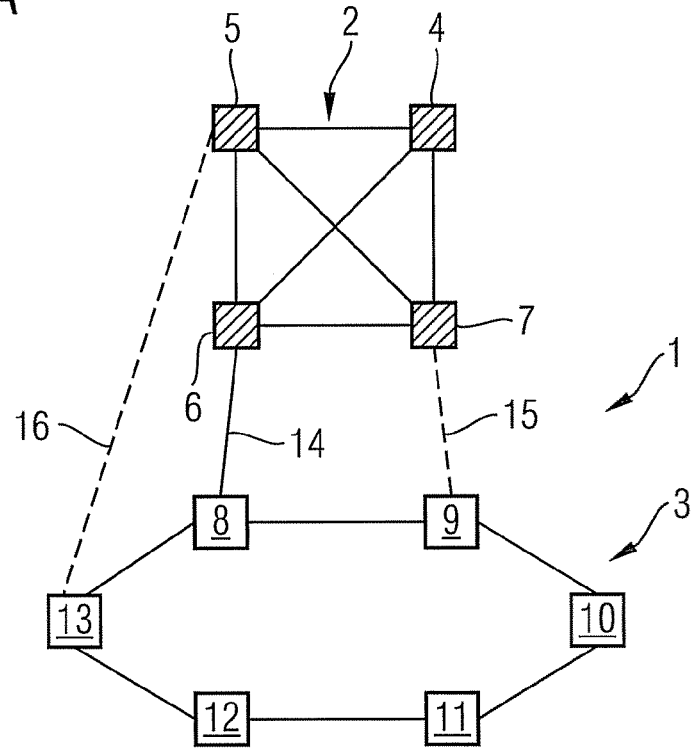

FIG. 1A-1D shows in diagrammatic form an exemplary embodiment of the inventive communications network. The communications network identified as a whole by the reference number 1 comprises a mesh-type, bridge-switched office LAN 2 installed in an office environment, and a ring-shaped, bridge-switched industrial LAN 3 installed in an industrial environment.

The physical topology of the office LAN 2 comprises four bridges 4-7, which are networked together in each case via point-to-point connection lines (data links) in a mesh-type arrangement. In the figures the data links are represented by solid lines and are otherwise not further identified.

The network protocol RSTP standardized according to IEEE Standard 802.1w is executed in the office LAN 2. By means of the network protocol RSTP employed in the office LAN 2 a logical topology embodied in the form of a spanning tree is embodied on the physical topology of the office LAN 2 specifiable by the bridges and data links, which is employed exclusively for the exchange of useful data packets. The spanning tree is not characterized in greater detail in the figures.

The network protocol RSTP assigns unique identifiers (IDs) and path costs to all RSTP bridges and RSTP ports of the office LAN 2. In RSTP the bridges comprise the logical topology of the network by means of the data packets (data framework) passing through it autonomously, by making use of the layer-2 addresses of the network (MAC addresses, MAC=Medium Access Control) of the bridges.

In RSTP, the ports of the bridges assume different statuses, in particular a "Blocking" status, in which only configuration frameworks, so-called BPDUs (BPDU=Bridge Protocol Data Unit), are accepted by the bridges, a "Listening" status, during which the active logical topology in the is foamed form of a spanning tree, a "Learning" status, during which a bridging-table is put together from the MAC addresses which have been read, a "Forwarding" status, in which the ports forward useful data, and a "Disabled" status, in which ports neither receive nor forward useful data or BPDUs. With the aid of the information contained in the BPDUs, the bridges can change the statuses of their ports.

Each configuration framework (BPDU) contains a series of fields, such as a flag field for the display or confirmation of a topology change, a root bridge ID field for identification of the root bridge, specifying priority and ID, a path costs field for specifying the path costs of the root bridge transmitting the BPDUs, a message age field (MessAge) to specify the period since transmission of the BPDU, a MaxAge field for specifying a period after the expiration of which the message is to be deleted, a hello-time field to specify the interval between regular configuration messages (hello signals) from the root bridge, and a forward delay field, which gives the delay after a change of topology.

In order to form a loop-free logical topology, four criteria are used in RSTP for determining the highest priorities of the bridges or their ports. These are: the smallest root bridge ID, the lowest path costs to the root bridge, the smallest transmit bridge ID and the smallest port ID.

In order to determine a root bridge, all ports of the bridges in RSTP initially take on the status "Blocking" after the initialization (for example after network restart), where each bridge assumes that it is itself a root bridge and sends a corresponding BPDU to the other bridges with its own ID as root bridge ID. The bridge with the lowest root bridge ID is then selected as root bridge. In the case of identical root bridge IDs, the lowest MAC address is applied as a supplementary criterion.

From the selected root bridge, all network paths of the spanning tree are then defined via which data, exchange between the bridges in the communications network is to take place. To this end the root bridge initially transmits BPDUs to the other bridges. Each bridge then designates as the root port a port having the lowest path costs to the root bridge. In the case of identical path costs, the port ID is taken as a supplementary criterion. Designate-ports are then determined on the basis of the path costs and the designated bridges of the spanning tree also determined.

In RSTP, the root bridge informs all bridges in the spanning tree at regular intervals that it is still there, by means of an appropriate BPDU (HelloSignal). If no such hello-signal is forthcoming, possibly due to the failure of a link or of the root bridge itself, a reconfiguration (reconvergence) of the communications network to determine a new spanning tree is required. As during this time only BPDUs, that is data packets for the determination of a new spanning tree, are transmitted, the communications network cannot be used for an exchange of useful data during this period.

In RSTP, alternative ports are additionally determined that block BPDUs from other bridges and offer an alternative path to the root bridge if the root port fails.

Furthermore in RSTP a proposal/agreement handshake mechanism is implemented between directly connected bridges. By means of the proposal/agreement handshake mechanism, RSTP bridges transmit BPDUs to the neighboring bridges at prescribed intervals. In RSTP it is stipulated that a bridge loses its link to a neighboring bridge if it cannot receive BPDUs within a prescribed period. In this way a failure of a links can rapidly be detected.

The topology of the industrial LAN 3 comprises six bridges 8-13, which are connected to one another via the respective point-to-point data links in a ring-shaped configuration. In the figures the data links between the bridges are represented by means of a solid line and are not otherwise designated in greater detail.

In the industrial LAN 3 an Ethernet standard-based proprietary network protocol is executed which is different from the network protocol RSTP of the office LAN 2. The bridges 8-13 thus here differ from the RSTP bridges of the office LAN 2 and are hereinafter referred to as the "proprietary bridges" of the industrial LAN 3.

The office LAN 2 and the industrial LAN 3 are connected together by data technology means via three redundant data links 14-16. These are a master data link initialized as activated for the exchange of useful data and two slave data links 15, 16 initialized as inactivated for the exchange of useful data.

FIG. 1A represents an initial situation for execution of the inventive method, in which the master data link 14 is activated and the two slave data links 15, 16 inactivated. In FIG. 1A the activated master data link 14 is thus represented by a solid line, while the two inactivated slave data links 15, 16 are represented by means of dotted lines. The two slave data links 15, 16 serve as activatable redundant connections (back-up data links) between the two networks 2, 3.

The master data link 14 is connected to an RSTP-executing RSTP port of the RSTP bridge 6 of the office LAN 2 and a proprietary port of the proprietary bridge 8 ("master bridge") of the industrial LAN 3 using the proprietary network protocol. A first slave data link 15 is connected to a RSTP-executing RSTP port of the RSTP bridge 7 of the office LAN 2 and a proprietary port of the proprietary bridge 9 of the industrial LAN 3. A second slave data link 16 is connected to an RSTP executing RSTP port of the RSTP bridge 5 of the office LAN 2 and a proprietary port of the proprietary bridge 13 of the industrial LAN 3. To this extent, each data link between the two networks 2, 3 connects a bridge of one network with a separate bridge of the other network.

Both ports connected to the master data link 14 are activated, where in particular the RSTP port of the RSTP bridge 6 of the office LAN 2 is in its "Forwarding" status. For blocking of the first slave data link 15, the RSTP port of the RSTP bridge 7 of the office LAN 2 connected to the first slave data link 15 is transferred to its "Blocking" status. To block the second slave data link 16 the RSTP port of the RSTP bridge 5 of the office LAN 2 connected to the second slave data link 16 is transferred to its "Blocking" status.

In the communications network 1 represented in the figures RSTP path costs are assigned to the RSTP bridges of the office LAN 2 and the bridges 8, 9, 13 of the industrial LAN 3 directly connected to the office LAN 2 via the data links 14-16. In the master bridge 8 of the industrial LAN 3 connected to the master data link 14, the path costs of all bridges of the industrial LAN 3 directly connected to the office LAN 2 are stored in a data storage unit. Alternatively, the path costs of the slave bridges of the industrial LAN 3 directly connected to the office LAN 2 can be transmitted to the master bridge 8 via messages (data packets) generated by the slave bridges, in particular on the basis of the proprietary network protocol of the industrial LAN 3.

Figure 1B:
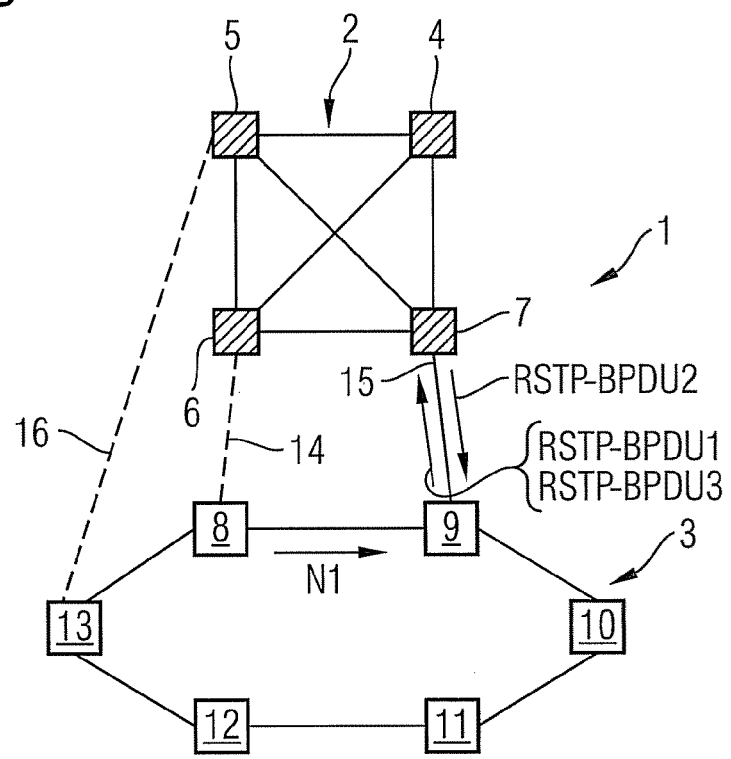

FIG. 1B depicts a situation in which, based on the situation portrayed in FIG. 1A with activated master data link 14, this has failed for the transmission of useful data. In FIG. 1B the failed master data link 14 is represented by means of a dotted line. The failure of the activated master data link 14 is detected by the two bridges connected by the master data link 14 through the non-receipt of a signal ("loss of signal") by an appropriate device for detecting the absence of a signal (hardware-detector). In the master bridge 8 of the industrial LAN 3 this initiates a hardware-alarm, following which a first data packet N1 is generated by the master bridge 8.

Then the master bridge 8 selects, from the two slave bridges 9, 13, that to which the lower RSTP path costs are assigned. In the exemplary embodiment from FIG. 1B, this is the slave bridge 9 of the first slave data link 15.

The master bridge 8 then transmits the first data packet N1 to the slave bridge 9 connected to the first slave data link 15 via the corresponding data link of the ring-shaped industrial LAN 3, using the proprietary network protocol of the industrial LAN. The first data packet N1 contains logical information, by means of which the slave bridge 9 is informed that the master link 14 has failed for the exchange of useful data. For this purpose, a flag "Failed master data link" is set in the first data packet N1 for example.

Through reception and processing of the first data packet N1 by the slave bridge 9 a partial or complete execution of the network protocol RSTP according to IEEE Standard 802.1w is initiated on that port of the slave bridge 9 which is connected to the first slave data link 15. The slave bridge 9 of the industrial LAN 3 hereby appears to the office LAN 2 as an RSTP bridge.

The slave bridge 9 of the industrial LAN 3 hereby has allocated to it a highest bridge ID, that is the lowest priority, of all RSTP bridges of the office LAN 2, by means of which it can be ensured that upon creation of a spanning tree of the office LAN 2 the slave bridge 9 is not selected in an undesired manner as the new root-bridge.

The slave bridge 9 of the industrial LAN 3 now provided with an RSTP port then generates a first RSTP configuration framework (RSTP BPDU1) and transmits the first RSTP configuration framework to the RSTP bridge 7 of the office LAN 2 connected to the first slave data link through its RSTP port via the first slave data link 15. Within the framework of the handshake mechanism implemented in RSTP, the RSTP configuration framework RSTP BPDU1 is a proposal for activation of the (blocked) RSTP port of the RSTP bridge 7 of the office LAN 2 connected to the first slave data link 15.

After reception and processing of the first RSTP configuration framework by the RSTP bridge 7 of the office LAN 2, the RSTP bridge 7 generates a second RSTP configuration framework (RSTP BPDU2) and transmits the second RSTP configuration framework to the slave bridge 9 of the industrial LAN 3. The second RSTP configuration framework is a further proposal.

After reception and processing of the second RSTP configuration framework by the slave bridge 9, this generates a third RSTP configuration framework (RSTP BPDU3) and transmits the third RSTP configuration framework to the RSTP bridge 7 of the industrial LAN 3. The third RSTP configuration framework is an Agreement. After receipt of the Agreement, the RSTP port of the RSTP bridge 7 of the first slave data link 15 is transferred to its "Forwarding" status, whereby the blocked first slave data link 15 is transferred to its active status, enabling an exchange of useful data between the two networks. This is illustrated in FIG. 1B by means of a solid line for the first slave data link 15. The handshake mechanism for activation of the blocked RSTP port connected to the first slave data link 15 corresponds to the standardized routines according to IEEE Standard 802.1w.

FIG. 1C represents a further situation, in which the first slave data link 15 activated for the transmission of useful data has failed. The failure of the first slave data link 15 is detected by the slave bridge 9 connected to the first slave data link 15, for example by means of a hardware detector, which can detect the non-receipt of configuration BPDUs transmitted from the bridge 7 of the office LAN 2. In the slave bridge 9 of the industrial LAN 3, this initiates a hardware-alarm, following which a second data packet N2 is generated by the slave bridge 9.

The slave bridge 9 then transmits the second data packet N2 to the master bridge 8 connected to the master data link via the corresponding data link of the ring-shaped industrial LAN 3, using the proprietary network protocols of the industrial LAN 3 10. The second data packet N2 contains logical information, by means of which the master bridge 8 is informed that the first slave data link 15 has failed for the exchange of useful data. For this purpose a flag "Failed slave data link" is set in the second data packet N2 for example.

In the master bridge 8 of the industrial LAN 3 the detection of the failure of the first slave data link 15 initiates a hardware-alarm by means of the second data packet, following which a first data packet N1 is once more generated by the master bridge 8.

The master bridge 8 then selects the next slave bridge 13 for transmission of the generated first data packet N1. The master bridge 8 selects such a slave bridge, to which are assigned the next lower RSTP path costs with reference to the slave bridge 9 connected to the failed first slave data link 15, here the slave bridge 13.

The master bridge 8 then transmits the first data packet N1 to the slave bridge 13 connected to the second slave data link 16 via the corresponding data link of the ring-shaped industrial LAN 3, using the proprietary network protocol of the industrial LAN. The first data packet N1 contains logical information, by means of which the slave bridge 13 is informed that the master data link 14 has failed for the exchange of useful data. For this purpose in the first data packet N1 for example a "Failed master data link" flag is set.

Through reception and processing of the first data packet N1 by the slave bridge 13 of the second slave data link 16, a partial or complete execution of the network protocol RSTP according to IEEE Standard 802.1w is initiated at each port of the slave bridge 13 which is connected to the second slave data link 16. The slave bridge 13 of the industrial LAN 3 hereby appears to office LAN 2 as the RSTP bridge.

The slave bridge 13 of the industrial LAN 3 now provided with an RSTP port then generates a first RSTP configuration framework (RSTP BPDU1) and transmits the first RSTP configuration framework through its RSTP port via the second slave data link 16 to the RSTP bridge 5 of the office LAN 2 connected to the second slave data link. Within the framework of the handshake mechanism implemented in RSTP the RSTP configuration framework RSTP BPDU1 is a proposal for activation of the (blocked) RSTP port of the bridge 5 of the office LAN 2 connected to the second slave data link 16.

After reception and processing of the first RSTP configuration framework by the RSTP bridge 5 of the office LAN 2 the RSTP bridge 5 generates a second RSTP configuration framework (RSTP BPDU2) and transmits the second RSTP configuration framework to the slave bridge 13 of the industrial LAN 3. The second RSTP configuration framework is a further Proposal.

After reception and processing of the second RSTP configuration framework by the slave bridge 13 this generates a third RSTP configuration framework (RSTP BPDU3) and transmits the third RSTP configuration framework to the bridge 5 of the industrial LAN 3. The third RSTP configuration framework is an Agreement. After reception of the Agreement, the RSTP port of bridge 5 of the second slave data link 16 is transferred to its "Forwarding" status, whereby the blocked second slave data link 16 is transferred to its active status, in which an exchange of useful data between the two networks is enabled. This is illustrated in FIG. 1C by means of a solid line for the second slave data link 16. The handshake mechanism for activation of the blocked RSTP port connected to the second slave data link 16 corresponds to the standardized routines according to IEEE-Standard 802.1w.

FIG. 1D represents a further situation, in which the master data link 14 is restored after its failure. The master bridge 8 of the industrial LAN 3 connected to the master data link 14 detects from once more incoming signals, which are transmitted from the bridge 6 of the office LAN 2 connected to the master data link 14, the restored master data link 14. The detection of the signals takes place by means of the hardware detector, which has also detected the absence of signals. This triggers the generation of a third data packet N3 by the master bridge 8.

The third data packet N3 is then transmitted to the slave bridges 9, 13 via the data links of the industrial LAN 3 using the proprietary network protocol of the industrial LAN 3. By means of the third data packet N3, the slave bridges 9, 13 are informed of the fact that the master data link 14 has been restored. For this purpose a flag "Failed master data link" is deleted in the third data packet N3 for example.

Through the reception and processing of the third data packet N3 by the slave bridges 9, 13 a termination of the execution of the network protocol RSTP for the respective port of the slave bridges connected to the slave data link is in each case initiated. The ports of the slave bridges 9, 13 connected to the slave data links are in each case changed from an RSTP port back to a port controlled by the proprietary network protocol of the industrial LAN 3. The slave bridges 9, 13 no longer appear to the office LAN 2 as RSTP bridges.

The detection of the restored master data link 14 by the master bridge 8 further triggers the partial or complete execution of the network protocol RSTP according to IEEE Standard 802.1w (only) on that port of the master bridge 8, which is connected to the blocked master data link 14. The master bridge 8 hereby appears as an RSTP bridge to the office LAN 2.

The master bridge 8 of the industrial LAN 3 now provided with an RSTP port thereupon generates a first RSTP configuration framework (RSTP BPDU1) and transmits the first RSTP configuration framework via its RSTP port connected to the master data link 14 to the RSTP bridge 6 of the office LAN 2 connected to the master data link 14. This is illustrated in FIG. 1D by an arrow. Within the framework of the handshake-mechanism implemented in RSTP the configuration framework RSTP BPDU1 is a Proposal.

After reception and processing of the first RSTP configuration framework by the RSTP bridge 6 of the office LAN 2 die RSTP bridge 6 generates a second RSTP configuration framework (RSTP BPDU2) and transmits the second RSTP configuration framework to the master bridge 8. This is illustrated by means of an arrow in FIG. 1D. The second RSTP configuration framework is a Proposal for activation of the blocked RSTP port of the bridge 6 of the office LAN 2 connected to the master data link 14.

After reception and processing of the second RSTP configuration framework, the master bridge 8 of the industrial LAN 3 generates a third RSTP configuration framework (RSTP BPDU3) and transmits the third RSTP configuration framework via its RSTP port connected to the master data link 14 to the RSTP port 6 of the office LAN 2 connected to the master data link 14. This is illustrated in FIG. 1D by means of an arrow.

The third RSTP configuration framework is an Agreement for activation of the blocked RSTP port of the bridge 6 of the office LAN 2 connected to master data link 14.

The blocked RSTP port of the RSTP bridge 6 of the office LAN 2 connected to the master data link 14 is thereupon transferred to its "Forwarding" status. The blocked master data link 14 is hereby transferred to its active status, so that an exchange of useful data between the two networks 2, 3 via the master data link 14 is enabled.

The handshake mechanism disclosed above for activation of the blocked RSTP port of the RSTP bridge 6 of the office LAN 2 connected to the master data link 14 takes place by means of routines standardized in the IEEE Standard 802.1w.

The second RSTP configuration framework (RSTP BPDU2) received from master bridge 8 of the industrial LAN 3 is further forwarded unchanged to the slave bridge 13 connected to the second slave data link 16. Forwarding here takes place by means of the proprietary network protocol of the industrial LAN 3. After reception, the slave bridge 13 connected to the second slave data link 16 forwards the second RSTP configuration frame (RSTP-BPDU2) to the RSTP bridge 5 of the office LAN 2 connected to the second slave data link 16 in unchanged form. The RSTP port of the 16 RSTP bridge 5 of the office LAN 2 connected to the second slave data link 16, which is in the "Forwarding" status is transferred to its "Blocking" status, so that the second slave data link 16 is inactivated.

Subsequently, after activation of the master data links 14 and after forwarding of the second RSTP configuration framework (RSTP BPDU2) by the master bridge 8 of the industrial LAN 3, termination of the execution of the network protocol RSTP for the port of the master bridge 8 connected to the master data link 14 is initiated. The port of the master bridge 8 connected to the master data link 14 is thus changed from an RSTP port to a port controlled by the proprietary network protocol of the industrial LAN 3 once more. The master bridge 8 then no longer appears as an RSTP bridge to the office LAN 2.

By means of the inventive method a reconfiguration of a multiply-redundant data link between networks using two different network protocols can be achieved in a simple manner. In particular an RSTP network can be connected to a further network in ring topology in a multiply-redundant configuration, where the reconfiguration times for reconfiguration of a data link connecting the two networks are very short. Restriction to a single redundant backup-data link is not necessary. In this way, a data link between the two networks can be maintained even in the event of multiple failures of the two data links connecting the networks. The effort required for configuration of such a communication network is low.

The invention claimed is:

1. A method of reconfiguring a packet-switched communications network with a first network using a first network-protocol and a second network using a second network protocol which differs from the first network protocol, the two networks being connected by three redundant data links, only one data link being activated for exchange of data, wherein a master data link is initialized as activated and two slave data links are initialized as inactivated, comprising:

detecting a failure of the master data link or a failure of an activated slave data link by a master bridge of the second network, the master bridge being connected to the master data link;

generating a first data packet by the master bridge;

selecting a slave bridge of the second network according to a specifiable selection rule by the master bridge;

transmitting the first data packet to the slave bridge of the second network, the slave bridge being connected through an inactive slave data link to a port of a bridge of the first network;

receiving and processing of the first data packet by the selected slave bridge, wherein the first data packet contains logical information to initiate a partial execution of the first network protocol on a port of the slave bridge connected to the inactive slave data link such that the selected slave bridge of the second network appears to the first network as a bridge configured according to the first network-protocol enabling activation of the slave data link by the first network protocol executed on the port of the slave bridge and changing the port of the bridge of the first network to a forwarding port for the exchange of useful data through the activated slave data link.

2. The method as claimed in claim 1, wherein the first data packet is transmitted from the master bridge of the second network to a slave bridge of the second network by the second network protocol.

3. The method as claimed in claim 1, wherein the detecting of the failure of the master data link by the master bridge connected to the master data link takes place based upon a non-reception by the master bridge of a signal from a bridge of the first network connected to the master data link.

4. The method as claimed in claim 1, further comprising:

detecting a failure of an activated slave data link by a slave bridge of the second network connected to the slave data link;

generating a second data packet by the slave bridge;

transmitting the second data packet to the master bridge;

receiving and processing the second data packet by the master bridge, wherein the second data packet contains logical information by which the master bridge is informed of the failure of the activated slave data link.

5. The method as claimed in claim 4, wherein the second data packet is transmitted from the slave bridge of the second network to the master bridge of the second network by means of the second network protocol.

6. The method as claimed in claim 1, wherein the slave bridge selected by the master bridge for transmission of the first data packet is selected according to path costs assigned to the slave bridges.

7. The method as claimed in claim 6, wherein slave bridges with lowest path costs are selected by the master bridge for activation of a slave data link upon failure of the master data link.

8. The method as claimed in claim 1, wherein the first network protocol is RSTP (Rapid Spanning Tree Protocol) according to IEEE Standard 802.

9. The method as claimed in claim 8, wherein the activation of a slave data link takes place by executing a handshake mechanism implemented in RSTP between the bridges directly connected with the slave data link.

10. The method as claimed in claim 8, further comprising:
  detecting a restoration of the failed master data link by the master bridge;
  generating a third data packet by the master bridge;
  transmitting the third data packet to a slave bridge connected to an activated slave data link;
  receiving and processing of the third data packet by the slave bridge, wherein the third data packet contains logical information by which a partial termination of the execution of the first network protocol on the slave bridge or termination of the transmission of RSTP configuration frameworks by the slave bridge is effected;
  activating the master data link; and
  inactivating the activated slave data link.

11. The method as claimed in claim 10, wherein the third data packet is transmitted from the master bridge of the second network to a slave bridge of the second network by the second network protocol.

12. The method as claimed in claim 10, wherein the third data packet is transmitted to all slave bridges connected to a slave data link.

13. The method as claimed in claim 10, wherein, after detecting the restoration of the master data link, a partial execution of the first network protocol takes place on a port of the master bridge connected to the master data link.

14. The method as claimed in claim 13, wherein an activation of the master data link takes place by execution of a handshake mechanism implemented in RSTP between the bridges directly connected to the master data link.

15. The method as claimed in claim 14, wherein for inactivating the slave data link forwarding of a configuration framework generated during the handshake mechanism by the master bridge to the bridge of the first network connected to the activated slave data link takes place.

16. The method as claimed in claim 13, wherein, after activation of the master data link, termination of the execution of the first network protocol on the port of the master bridge connected to the master data link takes place.

17. A packet-switched communications network, comprising:
  a first network using a first network protocol;
  a second network using a second network protocol differing from the first network protocol;
  three redundant data links, the two networks being connected by the three redundant data links, of which only one data link is activated for the exchange of data, wherein a master data link is initialized as activated, and two slave data links are initialized as inactivated;
  bridges, the bridges adapted to reconfigure a packet-switched communications network and configured to:
    detect a failure of the master data link or a failure of an activated slave data link by a master bridge of the second network, the master bridge being connected to the master data link;
    generate a first data packet by the master bridge;
    select a slave bridge of the second network according to a specifiable selection rule by the master bridge;
    transmit the first data packet to the slave bridge of the second network, the slave bridge being connected through an inactive slave data link to a port of a bridge of the first network;
    receive and process of the first data packet by the selected slave bridge,
    wherein the first data packet contains logical information to initiate a partial execution of the first network protocol on a port of the slave bridge connected to the inactive slave data link such that the selected slave bridge of the second network appears to the first network as a bridge configured according to the first network-protocol enabling activation of the slave data link by the first network protocol executed on the port of the slave bridge and changing the port of the bridge of the first network to a forwarding port for the exchange of useful data through the activated slave data link.

18. The packet-switched communications network as claimed in claim 17, wherein the configuration to detect the failure of the master data link by the master bridge connected to the master data link depends upon a non-reception by the master bridge of a signal from a bridge of the first network connected to the master data link.

19. The packet-switched communications network as claimed in claim 17, wherein the bridges are further configured to:
  detect a failure of an activated slave data link by a slave bridge of the second network connected to the slave data link;
  generate a second data packet by the slave bridge;
  transmit the second data packet to the master bridge;
  receive and process the second data packet by the master bridge,
  wherein the second data packet contains logical information by which the master bridge is informed of the failure of the activated slave data link.

20. A master bridge of a packet-switched communications network, the master bridge adapted to reconfigure the packet switched communications network and configured to:
  detect a failure of the master data link or a failure of an activated slave data link by a master bridge of the second network, the master bridge being connected to the master data link;
  generate a first data packet by the master bridge;
  select a slave bridge of the second network according to a specifiable selection rule by the master bridge;
  transmit the first data packet to the slave bridge of the second network, the slave bridge being connected through an inactive slave data link to a port of a bridge of the first network;
  receive and process of the first data packet by the selected slave bridge,
  wherein the first data packet contains logical information to initiate a partial execution of the first network protocol on a port of the slave bridge connected to the inactive slave data link such that the selected slave bridge of the second network appears to the first network as a bridge configured according to the first network-protocol enabling activation of the slave data link by the first network protocol executed on the port of the slave bridge and changing the port of the bridge of the first network to a forwarding port for the exchange of useful data through the activated slave data link.

* * * * *